United States Patent
Zhang

(10) Patent No.: US 10,963,152 B2
(45) Date of Patent: *Mar. 30, 2021

(54) MAP INTERFACE INTERACTION

(71) Applicant: Advanced New Technologies Co., Ltd., Grand Cayman (KY)

(72) Inventor: Shuhong Zhang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/914,065

(22) Filed: Jun. 26, 2020

(65) Prior Publication Data

US 2020/0326825 A1  Oct. 15, 2020

Related U.S. Application Data

(63) Continuation of application No. 16/405,343, filed on May 7, 2019, now Pat. No. 10,732,816, which is a
(Continued)

(30) Foreign Application Priority Data

Nov. 7, 2016  (CN) .......................... 201610976063.X

(51) Int. Cl.
  *G06F 3/0486*  (2013.01)
  *G06F 16/9537*  (2019.01)
  (Continued)

(52) U.S. Cl.
  CPC .......... *G06F 3/0486* (2013.01); *G06F 3/0481* (2013.01); *G06F 16/248* (2019.01);
  (Continued)

(58) Field of Classification Search
  CPC ...... G06F 3/0486; G06F 16/248; G06F 16/29; G06F 16/9537; G06F 3/0481;
  (Continued)

(56) References Cited

U.S. PATENT DOCUMENTS 10,732,816 B2  8/2020  Zhang
2008/0104027 A1  5/2008  Imler et al.
(Continued)

FOREIGN PATENT DOCUMENTS

CN  101996256  3/2011
CN  102708214  3/2012
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Quoc A Tran
(74) *Attorney, Agent, or Firm* — Fish & Richardson P.C.

(57) ABSTRACT

Techniques for map interface interaction are described. One example method includes receiving user input specifying a map search operation, the map search operation including a first location and a distance determining point each specifying a location in a set of map data representing a physical area; determining a selected distance between the first location and the distance determining point, wherein the selected distance represents a physical distance between the physical locations represented by the first location and the distance determining point; determining a demarcated range based on the first location and the selected distance, the demarcated range representing a subset of the physical area; and displaying one or more target objects in the demarcated range as a search result set, each target object associated with a physical location in the subset of the physical area represented by the demarcated range.

21 Claims, 20 Drawing Sheets

Related U.S. Application Data continuation of application No. PCT/CN2017/107481, filed on Oct. 24, 2017.

(51) Int. Cl.
  *G06F 16/248* (2019.01)
  *G06F 16/29* (2019.01)
  *G06F 3/0481* (2013.01)
  *G06F 16/951* (2019.01)
  *G06Q 30/02* (2012.01)
  *G06F 17/00* (2019.01)

(52) U.S. Cl.
  CPC .......... *G06F 16/29* (2019.01); *G06F 16/9537* (2019.01); *G06F 16/951* (2019.01); *G06Q 30/02* (2013.01)

(58) Field of Classification Search
  CPC ............... G06F 16/951; G06F 17/2725; G06F 3/04812; G06Q 30/02; H04W 4/021; H04W 64/006
  See application file for complete search history.

(56) References Cited

U.S. PATENT DOCUMENTS

| | | | |
|---|---|---|---|
| 2009/0210416 A1 | 8/2009 | Bennett | |
| 2010/0094548 A1 | 4/2010 | Tadman et al. | |
| 2011/0093458 A1 | 4/2011 | Zheng et al. | |
| 2011/0167058 A1* | 7/2011 | van Os | G06F 3/0488 707/722 |
| 2011/0193795 A1 | 8/2011 | Seidman et al. | |
| 2012/0068943 A1 | 3/2012 | Wang | |
| 2013/0173577 A1 | 7/2013 | Cheng et al. | |
| 2013/0176321 A1 | 7/2013 | Mitchell et al. | |
| 2016/0097654 A1* | 4/2016 | Beyeler | G06F 16/9537 701/532 |
| 2019/0258374 A1 | 8/2019 | Zhang | |
| 2019/0271555 A1* | 9/2019 | Sheridan | G01C 21/36 |

FOREIGN PATENT DOCUMENTS

| | | | |
|---|---|---|---|
| CN | 102473179 | 5/2012 | |
| CN | 102915348 | 2/2013 | |
| CN | 103425655 | 4/2013 | |
| CN | 103092965 | 5/2013 | |
| CN | 103955534 | 7/2014 | |
| CN | 104731783 | 6/2015 | |
| CN | 104915393 | 9/2015 | |
| CN | 105302886 | 2/2016 | |
| CN | 106933940 | 7/2017 | |
| JP | 2011192123 | 9/2011 | |
| TW | M530444 | 10/2016 | |
| TW | M530444 U * | 11/2016 | G06Q 50/16 |

OTHER PUBLICATIONS

Extended European Search Report issued in European Application No. 17868085.6 dated Jul. 18, 2019, 11 pages.

Nakamoto, "Bitcoin: A Peer-to-Peer Electronic Cash System," www.bitcoin.org, 2005, 9 pages.

PCT International Search Report issued in International Application No. PCT/CN2017/107481 dated Feb. 1, 2018, 16 pages (with English translation).

PCT International Preliminary Report on Patentability in International Application No. PCT/CN2017/107481, dated May 7, 2019, 10 pages (with English translation).

* cited by examiner

MAP INTERFACE INTERACTION

CROSS-REFERENCE TO RELATED APPLICATIONS

This application is a continuation of U.S. patent application Ser. No. 16/405,343, filed on May 7, 2019, which is a continuation of PCT Application No. PCT/CN2017/107481, filed on Oct. 24, 2017, which claims priority to Chinese Patent Application No. 201610976063.X, filed on Nov. 7, 2016, and each application is hereby incorporated by reference in its entirety.

TECHNICAL FIELD

The present application relates to the field of data processing technologies, and in particular, to a method, an apparatus, a system, a server, and a terminal for map interaction, search, and display.

BACKGROUND

Continuous development of Internet technologies leads to increasing reliance on Internet technologies in many aspects of life. Especially, because of the popularization of intelligent terminals, people depend on the intelligent terminals heavily.

For example, when going out, people used to get directions from a route memory or the sun. Now, people usually search for a destination and plan a route by using map software on a device such as a mobile phone or a computer. However, a map search and result display technology is imperfect currently, which is degrading user experience.

Currently, no effective solution to the previous problem is provided.

SUMMARY

An objective of the present application is to provide a method, an apparatus, a system, a server, and a terminal for map interaction, search, and display, to display a map search result based on a demarcated range, and improve user experience.

The method, the apparatus, the system, the server, and the terminal for map interaction, search, and display provided in the present application are implemented as follows:

A map interaction method is provided, including: obtaining a map search operation; determining a demarcated range and a target object based on the map search operation; and showing one or more target objects in the demarcated range as a search result set.

A map search method is provided, including: receiving a map search operation; determining a demarcated range and a target object based on the map search operation; and pushing one or more target objects in the demarcated range to a terminal side as a search result.

A map display method is provided, including: obtaining a map search operation; sending the map search operation to a server, where the map search operation carries a demarcated range and a target object; and receiving and displaying a search result returned by the server in response to the map search operation, where the search result includes one or more target objects in the demarcated range.

A map interaction method is provided, including: obtaining a map search operation, where the map search operation carries a first location and a second location; determining a distance between the first location and the second location in response to the map search operation; and marking the first location and the second location on a map interface, and drawing a line between the first location and the second location, where the distance between the first location and the second location is marked on the line.

A map interaction apparatus is provided, including: an acquisition module, configured to obtain a map search operation; a determining module, configured to determine a demarcated range and a target object based on the map search operation; and a showing module, configured to show one or more target objects in the demarcated range as a search result set.

A server is provided, including: a receiving module, configured to receive a map search operation; a determining module, configured to determine a demarcated range and a target object based on the map search operation; and a push module, configured to push one or more target objects in the demarcated range to a terminal side as a search result.

A terminal is provided, including: an acquisition module, configured to obtain a map search operation; a sending module, configured to send the map search operation to a server, where the map search operation carries a demarcated range and a target object; and a display module, configured to receive and display a search result returned by the server in response to the map search operation, where the search result includes one or more target objects in the demarcated range.

A map interaction system is provided, including the server and the terminal.

A map interaction apparatus is provided, including: an acquisition module, configured to obtain a map search operation, where the map search operation carries a first location and a second location; a determining module, configured to determine a distance between the first location and the second location in response to the map search operation; and a display module, configured to mark the first location and the second location on a map interface and draw a line between the first location and the second location, where the distance between the first location and the second location is marked on the line.

According to the map interaction method and apparatus provided in the present application, the map search operation is obtained; the demarcated range and the target object are determined based on the map search operation; and one or more target objects in the demarcated range are shown as a search result set. In other words, only a target object in the demarcated range is selected as a search result, so that a user can intuitively see a distance relationship between an initial location and the search result set by using one search process, to effectively improve user experience. An unnecessary search result does not need to be displayed, and a system resource is saved.

BRIEF DESCRIPTION OF DRAWINGS

To describe the technical solutions in the implementations of the present application or in the existing technology more clearly, the following briefly describes the accompanying drawings required for describing the implementations or the existing technology. Apparently, the accompanying drawings in the following description merely show some implementations of the present application, and a person of ordinary skill in the art can still derive other drawings from these accompanying drawings without creative efforts.

DESCRIPTION OF IMPLEMENTATIONS

To make a person skilled in the art understand the technical solutions in the present application better, the following clearly and comprehensively describes the technical solutions in the implementations of the present application with reference to the accompanying drawings in the implementations of the present application. Apparently, the described implementations are merely some but not all of the implementations of the present application. All other implementations obtained by a person of ordinary skill in the art based on the implementations of the present application without creative efforts shall fall within the protection scope of the present application.

It is worthwhile to note that terms "first", "second", etc. in the present specification, claims, and the accompanying drawings of the present invention are used to distinguish between similar objects, but are not necessarily used to describe a specific order or sequence. It should be understood that data used as such can be interchanged in an appropriate circumstance, so that the implementations of the present invention described here can be implemented in a sequence other than those illustrated or described here. In addition, terms "include" and "have" and any variants thereof are intended to cover non-exclusive inclusion, for example, a process, a method, a system, a product, or a device that includes a series of steps or units is not necessarily limited to expressly listed steps or units, but can include other steps or units that are not expressly listed or inherent to the process, the method, the product, or the device.

Figure 1:
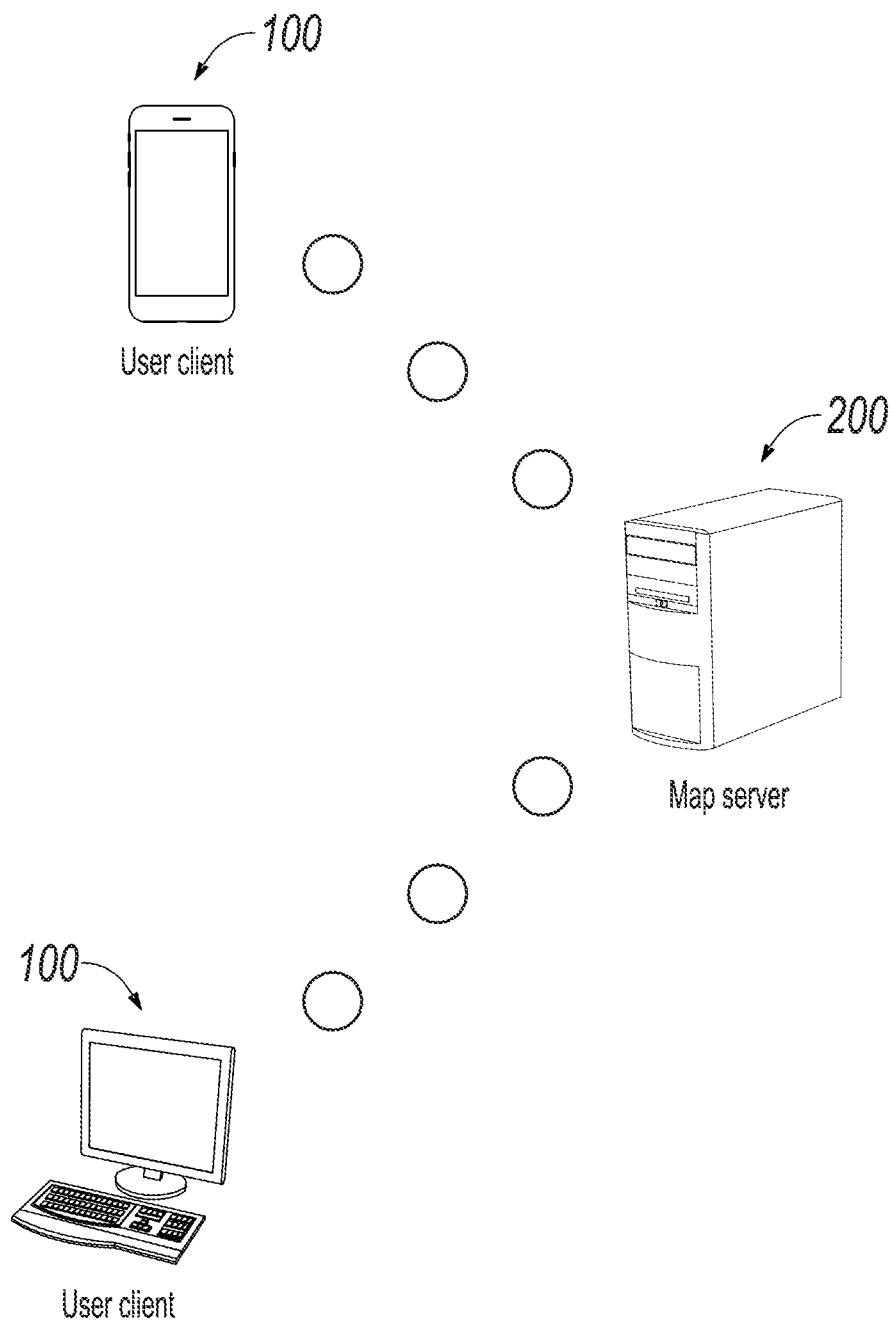
FIG. 1 is a schematic structural diagram illustrating a map interaction system, according to the present application.

Referring to FIG. 1, the present application provides a map interaction system. The system can include a user client 100 and a map server 200, and the user client 100 is coupled to the map server 200. The map interaction system can include one or more user clients 100.

The present application further provides a map interaction system, and the system can include a user client 100. When the user client 100 has locally stored map information, after the user client 100 receives a search request, the user client does not need to request the map information from a map server, but directly extracts the information from the user client for a search and determining.

The user client 100 can be a removable device. For example, the user client 100 can be a mobile phone or a tablet computer. The user client 100 can be a desktop device such as a desktop personal computer (PC) or an all-in-one machine.

A user can obtain data information on a map distribution server 200 by using different user clients 100 in different scenarios, to plan a route.

When the user searches the map information by using the user client 100, there can be a plurality of application scenarios. For example, a current location can be used as an initial location, or a location can be entered as an initial location, or a location can be directly tapped on a map interface and used as an initial location. How to select the initial location can be determined based on an actual need, and is not limited in the present application.

Figure 2:
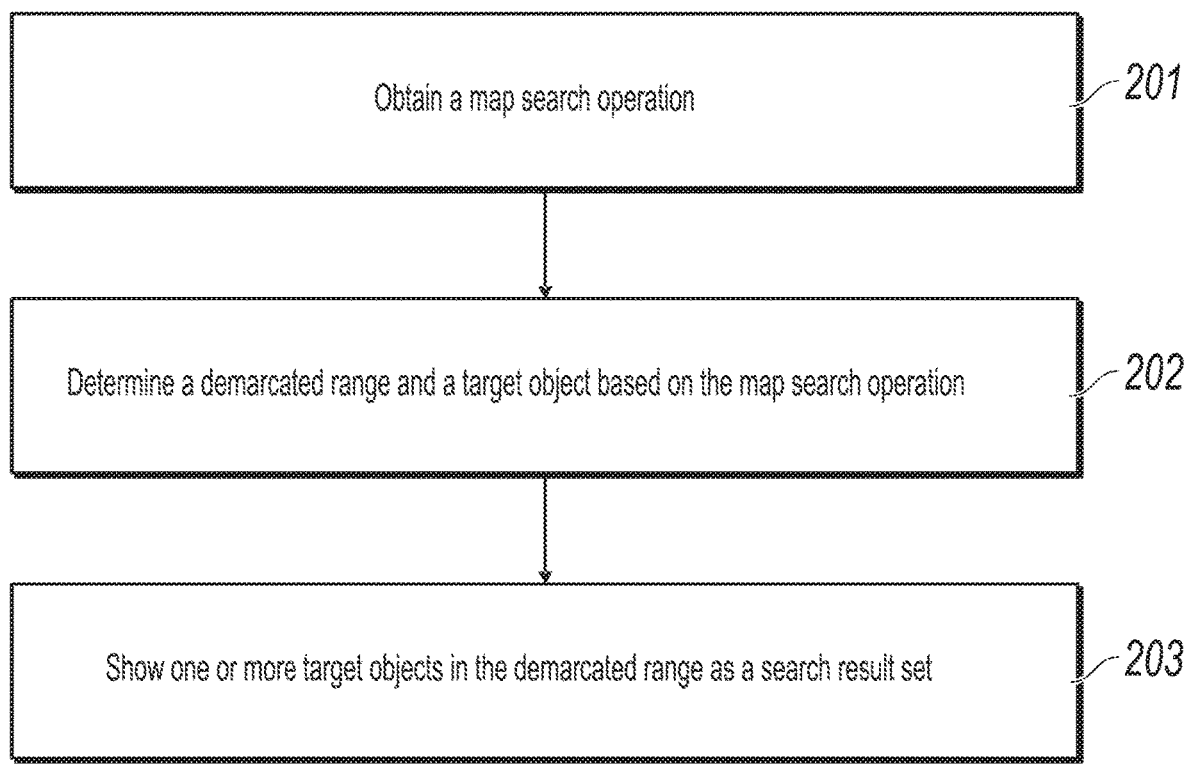
FIG. 2 is a flowchart illustrating a map display method, according to the present application.

In an example, a map display method is provided. As shown in FIG. 2, the method can include the following steps.

Step 201: Obtain a map search operation.

The map search operation can be a search operation generated by using information entered by a user in a search input box, or can be a search operation generated by using location information and distance information that are marked by a user on a map interface.

Figure 3:
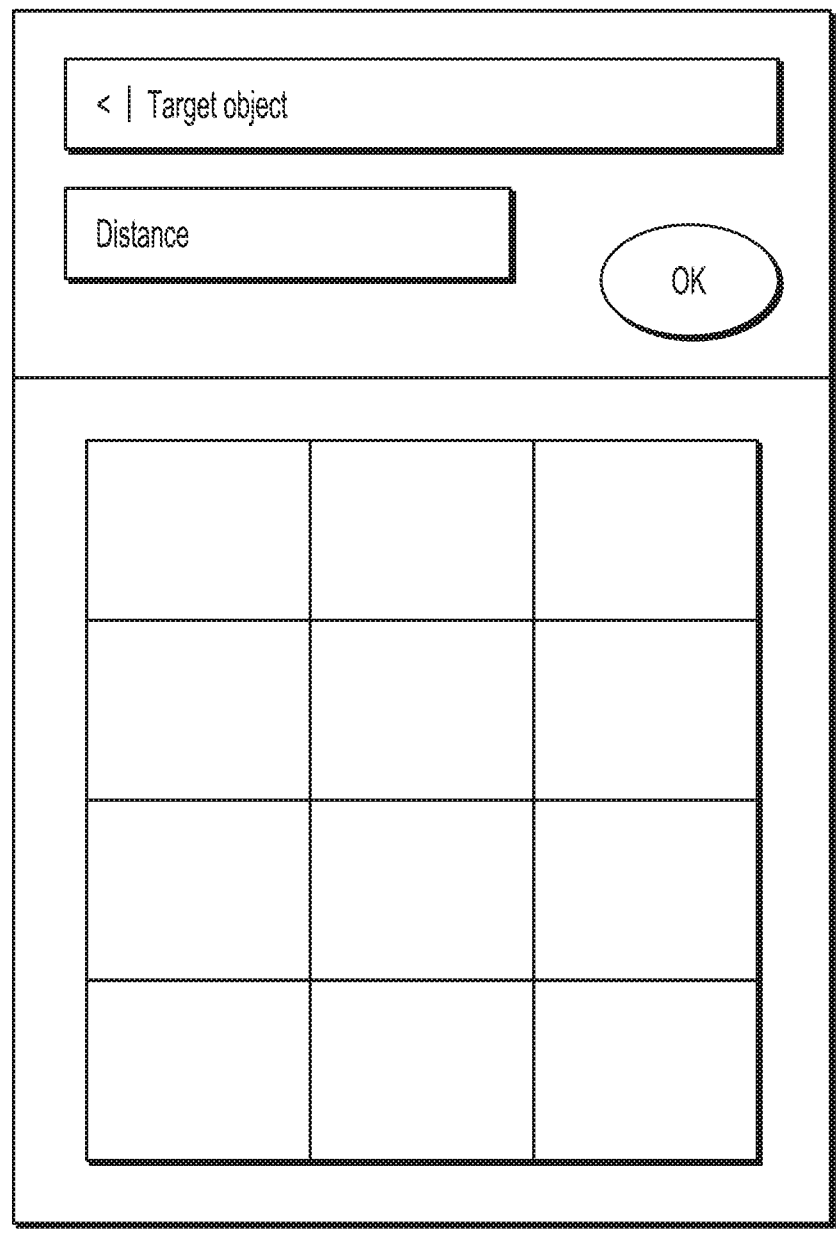
FIG. 3 is a schematic diagram illustrating a search request input interface, according to the present application.
Figure 4:
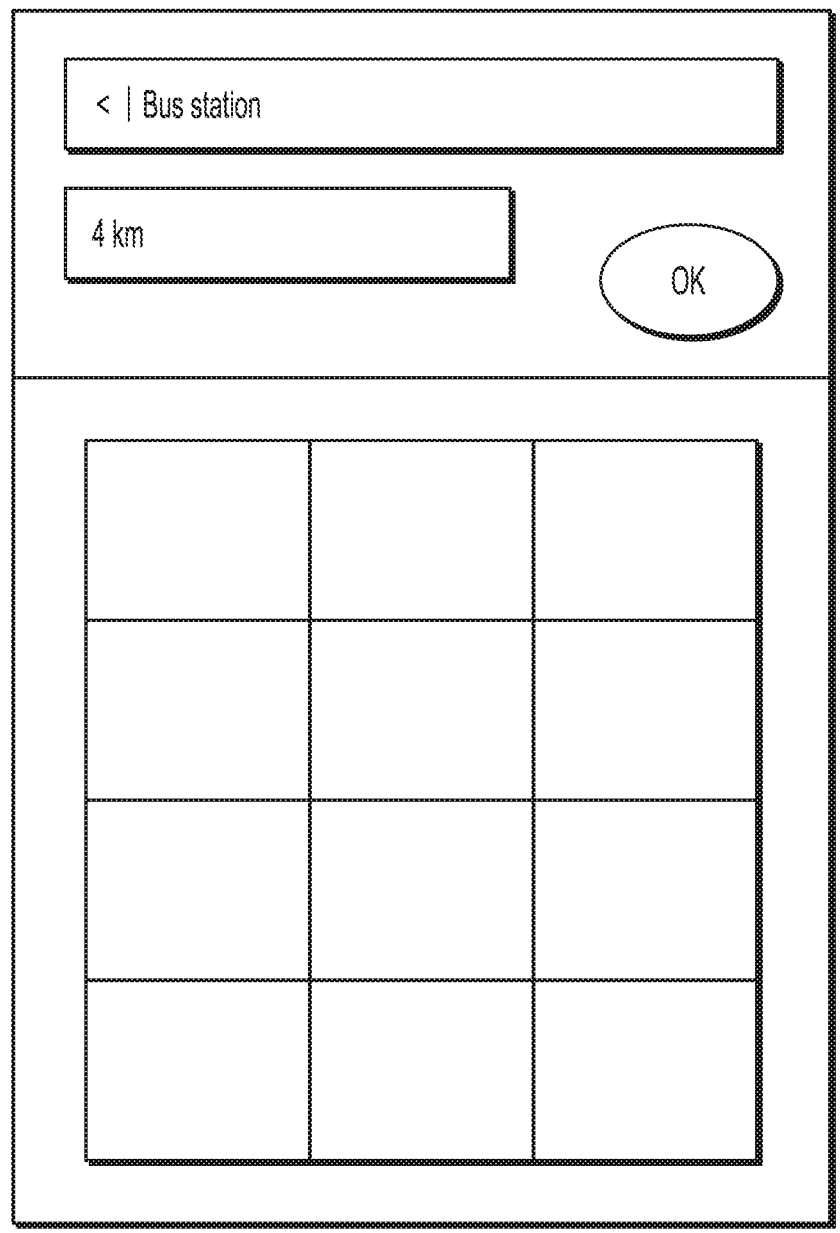
FIG. 4 is a schematic diagram illustrating an interface obtained after a search request is entered, according to the present application.

For example, the user can enter, on an interface shown in FIG. 3, a target object and a distance range that the user wants to search, to obtain a presentation result shown in FIG. 4. As shown in FIG. 4, a bus station and 4 kilometers are entered. A corresponding map search operation is to search for a bus station within 4 kilometers of a current location. As such, a final search result is a bus station within 4 kilometers. Correspondingly, an initial location is the current location.

In another implementation, a search input box can be set for entering an initial location. For example, if "Tianchao Company", "Supermarket", and "5 kilometers" are entered, a search operation is to search for a supermarket within 5 kilometers of Tianchao Company.

The initial location, the target object, or the distance range can be entered in a plurality of methods. The methods are not limited to the several listed methods, for example:

(1) The initial location can be entered in a text form, can be selected by directly tapping a map, can be selected by the user from a provided list of frequent sites, etc.

(2) The target object can be entered in a text form, or can be selected from a specified target object list. For example, the user can make a tap operation in the target object list, and the target object can be displayed as "selected".

(3) The distance range can be entered in a text form, can be marked through dragging on a map display interface by using a mouse or a touchscreen.

It is worthwhile to note that the listed selection and input methods are only example descriptions. In actual implementation, another input method can be used. Implementations are not limited in the present application.

Step 202: Determine a demarcated range and a target object based on the map search operation.

The determining a demarcated range based on the map search operation can include: extracting a first location and a selected distance from the map search operation; and determining the demarcated range based on the first location and the selected distance. To be specific, the first location can correspond to the initial location, and the selected distance can correspond to a distance selected or entered by the user.

For example, the extracting a first location and a selected distance from the map search operation can include the following steps:

S1: Obtain the first location marked on a map interface.

S2: Obtain a distance determining point selected based on the first location.

S3: Use a distance between the first location and the distance determining point as the selected distance.

Figure 5:
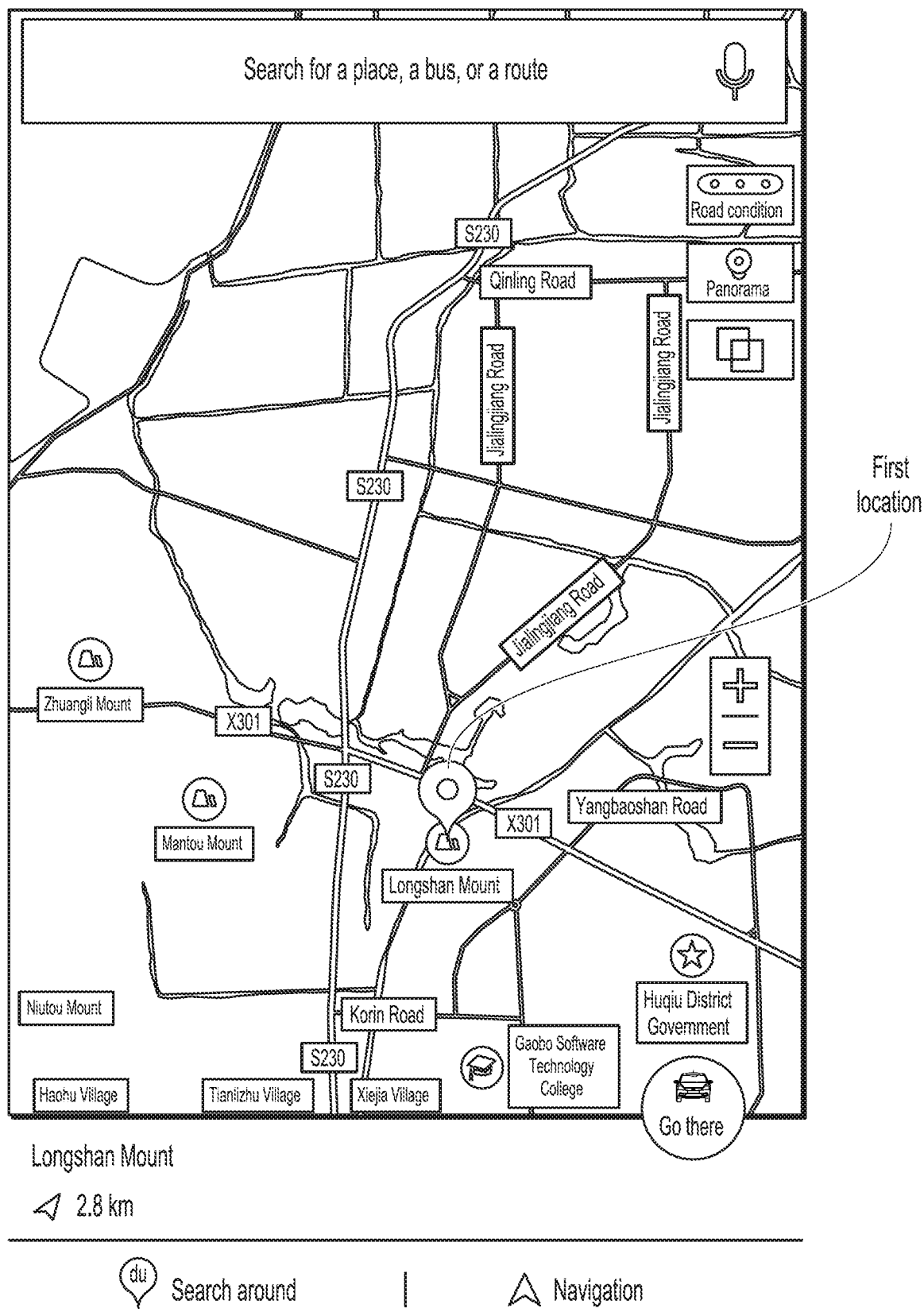
FIG. 5 is a schematic diagram illustrating a mark of a first location on a map interface, according to the present application.

To be specific, as shown in FIG. 5, the user can directly mark a location on the map interface as the first location (namely, the initial location). The marking operation can be implemented by using a predetermined operation such as a tap operation or a double-tap operation. After the first location is determined, one distance determining point can be determined, to determine the selected distance. In other words, one straight line is determined by using two points, or one distance is determined by using two points. The distance determining point can be determined in one of the following methods:

(1) A drag operation whose start point is the first location on the map interface is identified, and an end point of the drag operation is used as the distance determining point.

Figure 6:
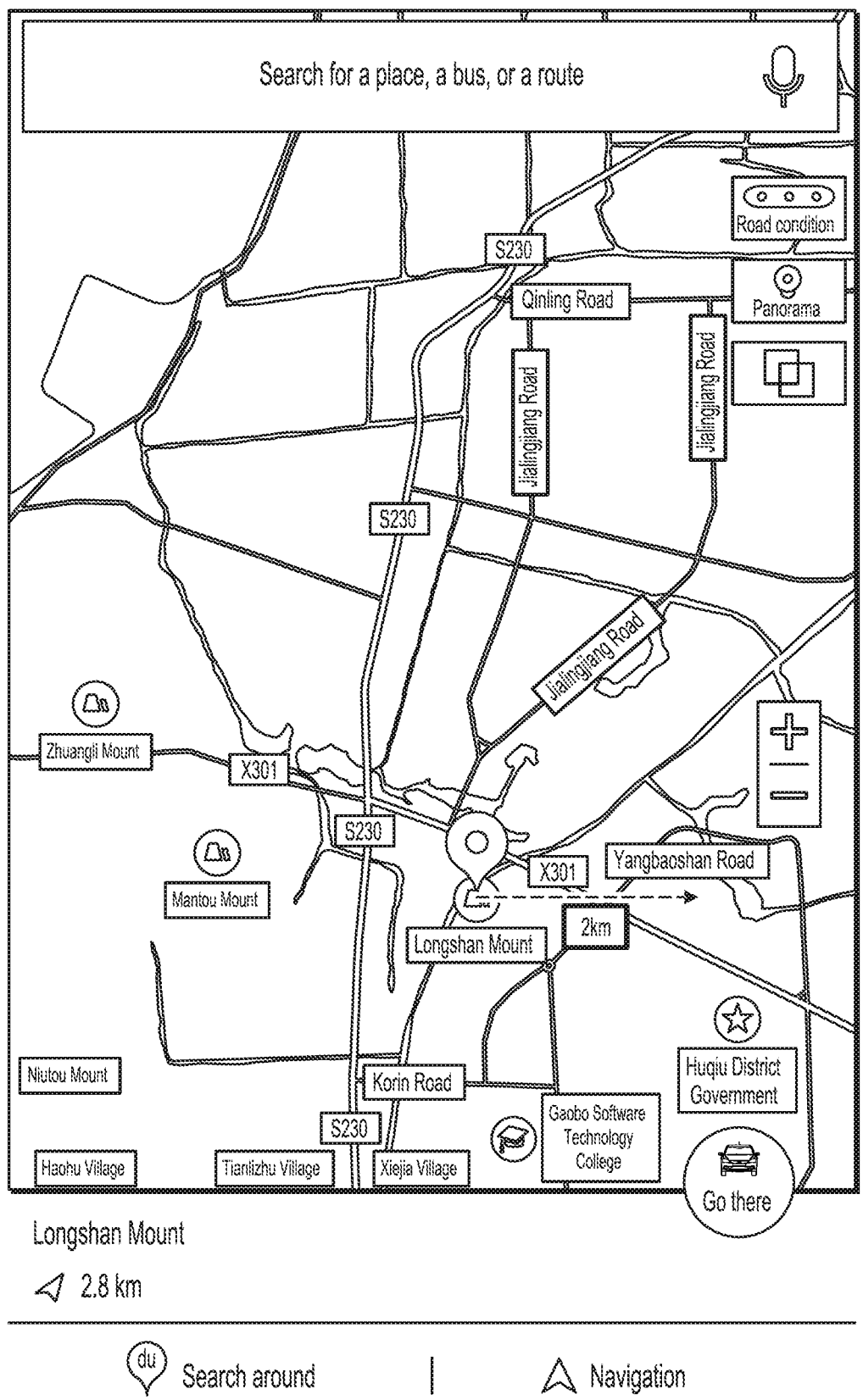
FIG. 6 is a schematic diagram illustrating a conversion of a drag operation into distance information, according to the present application.

To be specific, dragging can start from the first location, and a stop location is determined as the distance determining point; or after the first location is determined, one point is directly selected as the distance determining point. As shown in FIG. 6, during dragging, a drag operation can be converted into distance information in real time, to remind the user of a distance between a current location and the first location, so that the user determines whether dragging can be stopped. The current location is used as a drag stop location.

(2) A point selected by a user after the first location on the map interface is used as the distance determining point.

Figure 7:
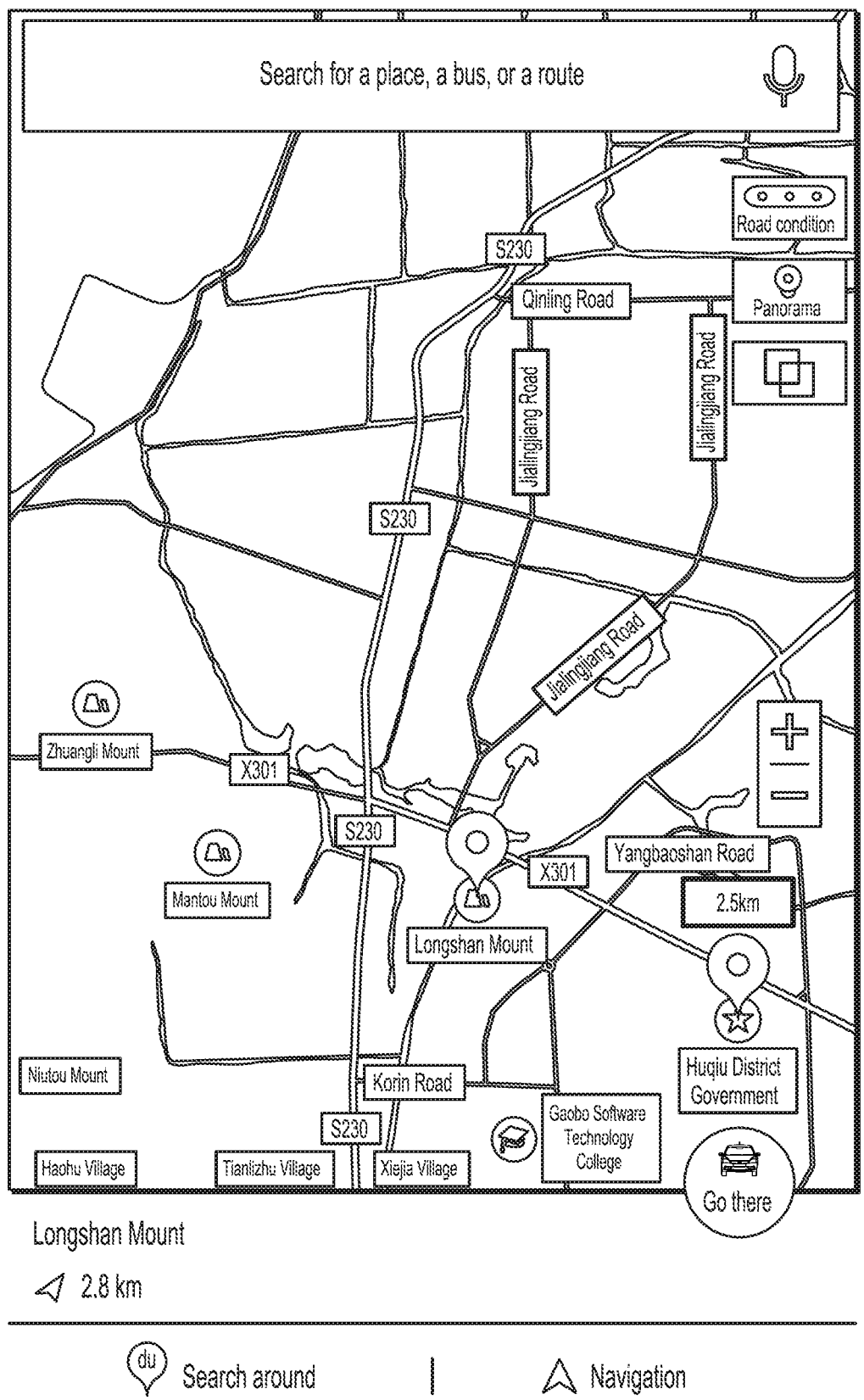
FIG. 7 is a schematic diagram illustrating a display after a first location and a second location are selected, according to the present application.

As shown in FIG. 7, after "Longshan Mount" is selected as the first location, and "Huqiu District Government" can be further tapped and selected as a second location. The second location is used as the distance determining point. A linear distance between the second location and the first location can be displayed, so that the user can know an approximate distance between the two locations.

However, it is worthwhile to note that the listed methods for selecting the distance determining point are only to better describe the present invention, but does not constitute an improper limitation on the present invention. In actual implementation, a relatively effective method for selecting the distance determining point can be selected based on an actual need and an actual requirement.

Figure 8:
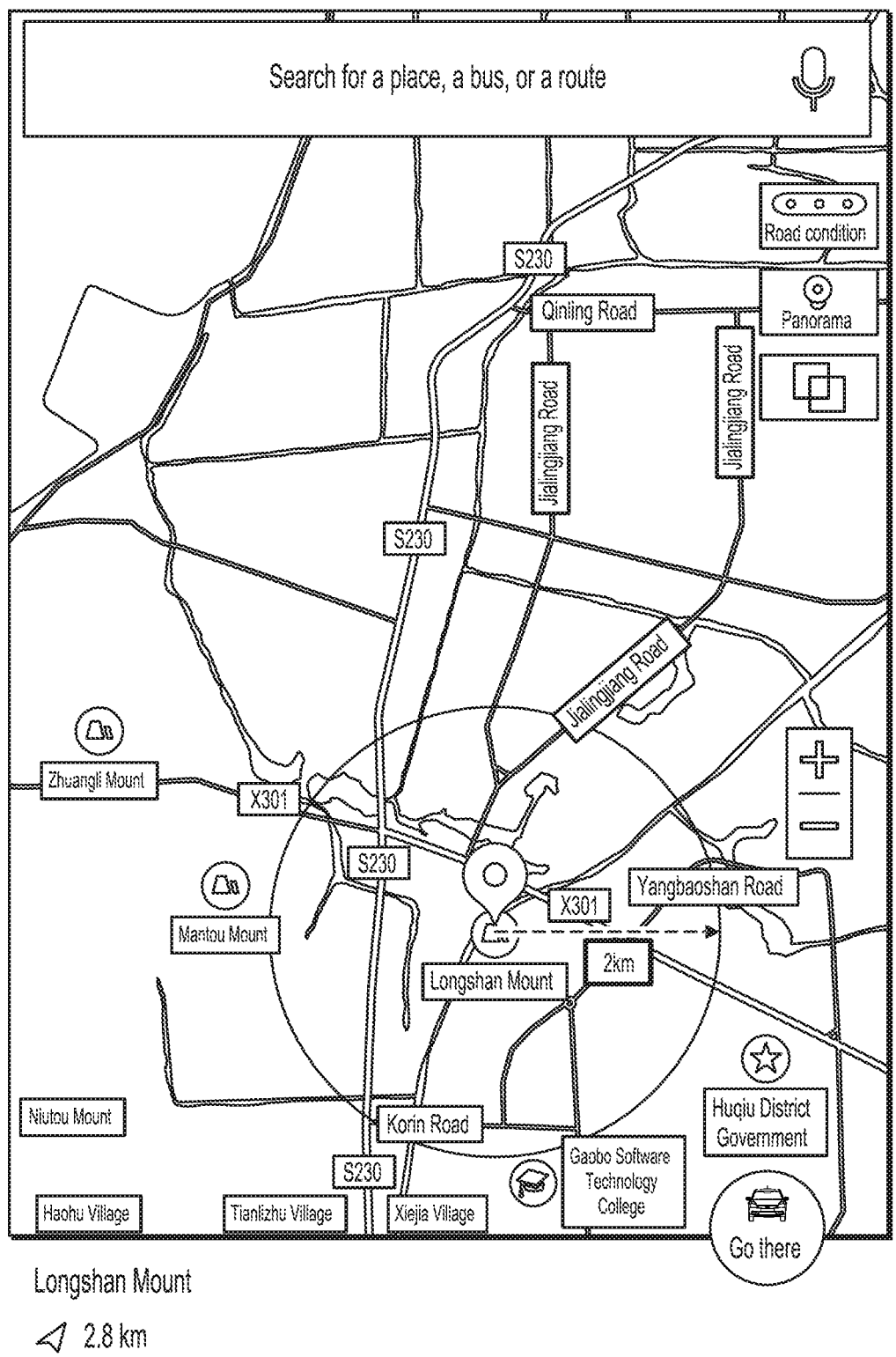
FIG. 8 is a schematic diagram illustrating a determined circular demarcated range, according to the present application.

In an implementation, the demarcated range can be determined by using methods that include but are not limited to the following methods:

Method 1: As shown in FIG. 8, a circle area is used as the demarcated range, and the circle area is generated by using the first location as a center and by using the distance between the first location and the distance determining point as a radius.

Figure 9:
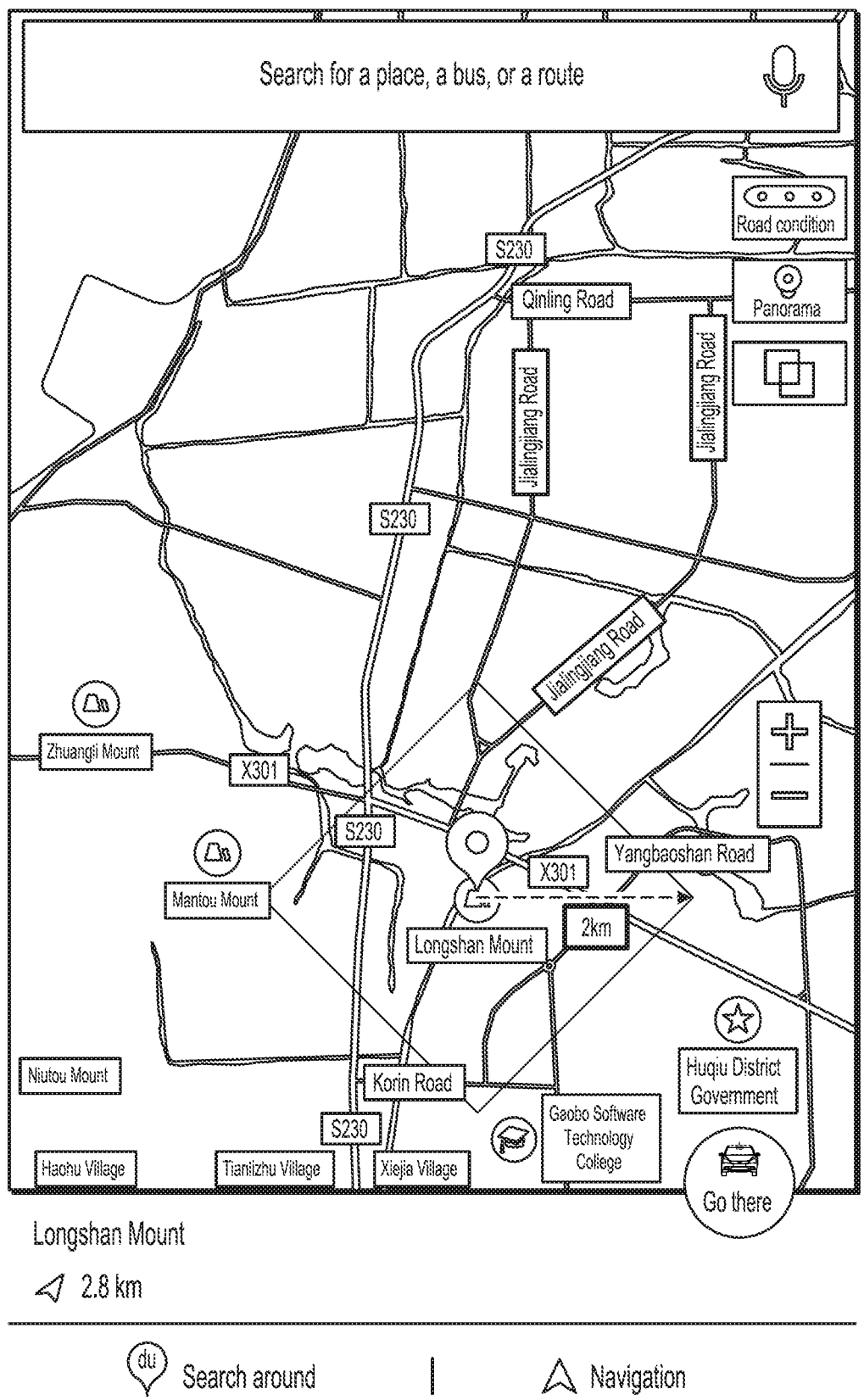
FIG. 9 is a schematic diagram illustrating a determined square demarcated range, according to the present application.

Method 2: As shown in FIG. 9, a square area is used as the demarcated range, and the square area is generated by using the first location as a center and by using the distance determining point as a vertex of a square.

Figure 10:
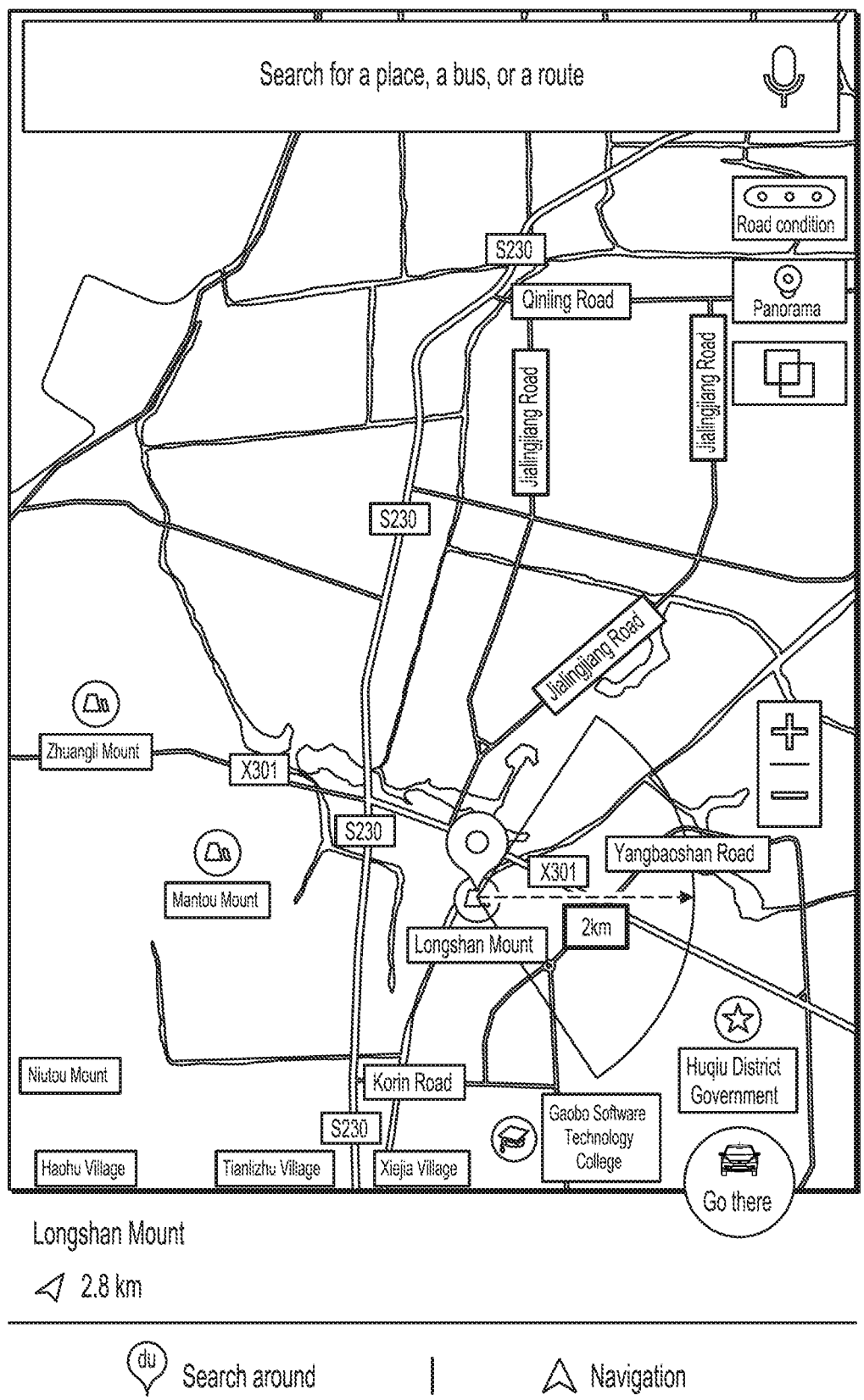
FIG. 10 is a schematic diagram illustrating a determined sectorial demarcated range, according to the present application.

Method 3: As shown in FIG. 10, a circular sector area with a predetermined angle is used as the demarcated range, and the circular sector area is generated by using the first location as a start point of the circular sector area, by using the distance between the first location and the distance determining point as a radius of the circular sector area, and by using a direction of the drag operation as a central direction of the circular sector area. For example, as shown in FIG. 10, the predetermined angle is 120°. Certainly, in actual implementation, another angle can be selected based on an actual need. A specific selected angle is not limited in the present application.

Step 203: Show one or more target objects in the demarcated range as a search result set.

Figure 11:
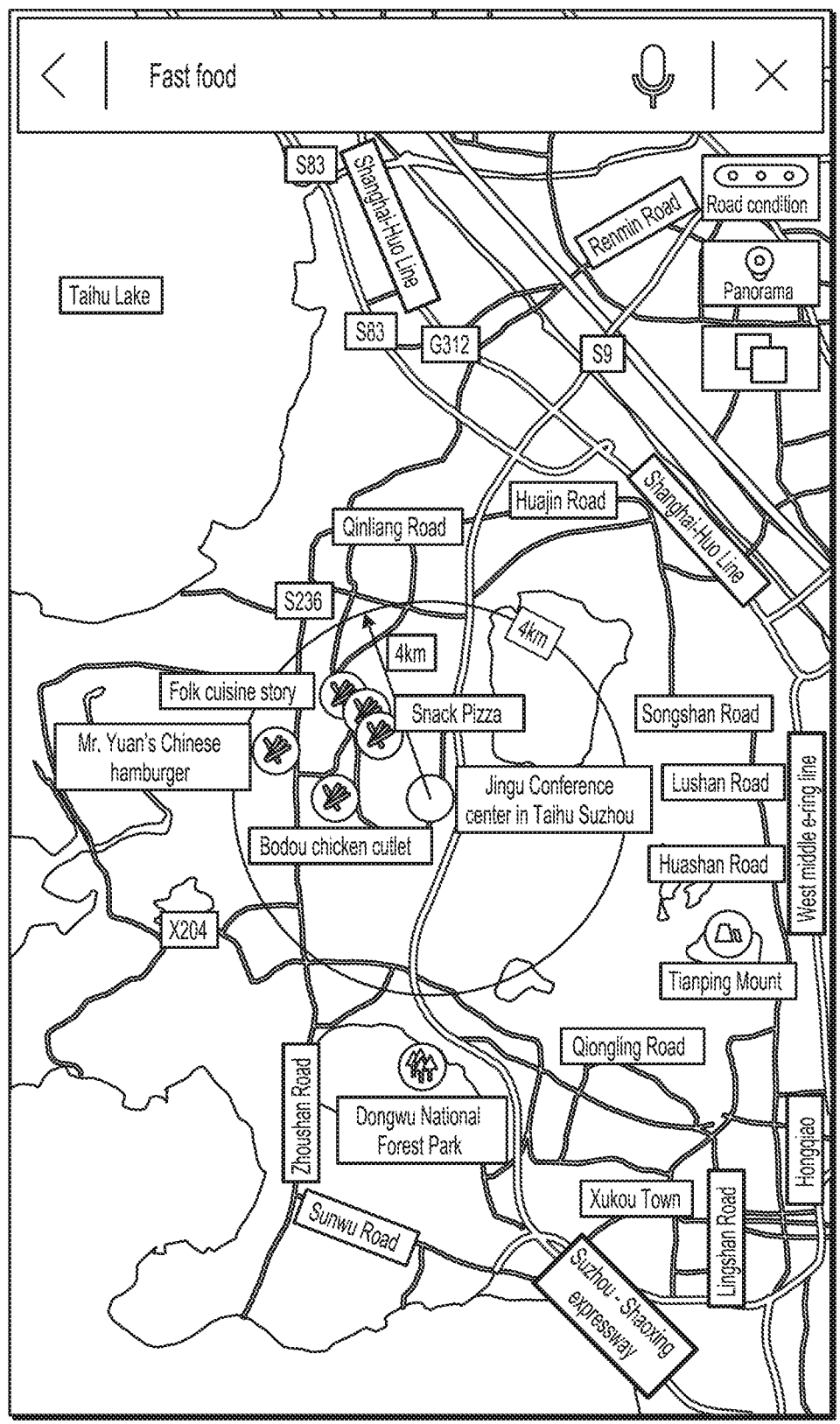
FIG. 11 is a schematic diagram illustrating a search result, according to the present application.

In an implementation, as shown in FIG. 11, the one or more target objects in the demarcated range can be shown as the search result set, and the demarcated range can be marked on the map interface. A plurality of search results can be obtained based on the first location, the demarcated range, and a target search object (fast food), and all the search results are fast food restaurants within 4 km of the first location, so that the search results are presented in the demarcated range. Therefore, when searching for an object in a predetermined range, the user can roughly determine a distance between each target search result and a start point, so that a distance parameter becomes more controllable, and the user can plan a search range more conveniently.

In the existing technology, when a user searches a map for content such as a hotel or a scenic spot that has a strong location attribute, a relative distance is usually extremely concerned, but a distance parameter in a current interaction method for searching a map can hardly be controlled. According to the method provided in the previous example, the existing problem is alleviated, and the user can know a relative location better during a search, so that the user can more intuitively and conveniently make a search in a demarcated range.

Figure 12:
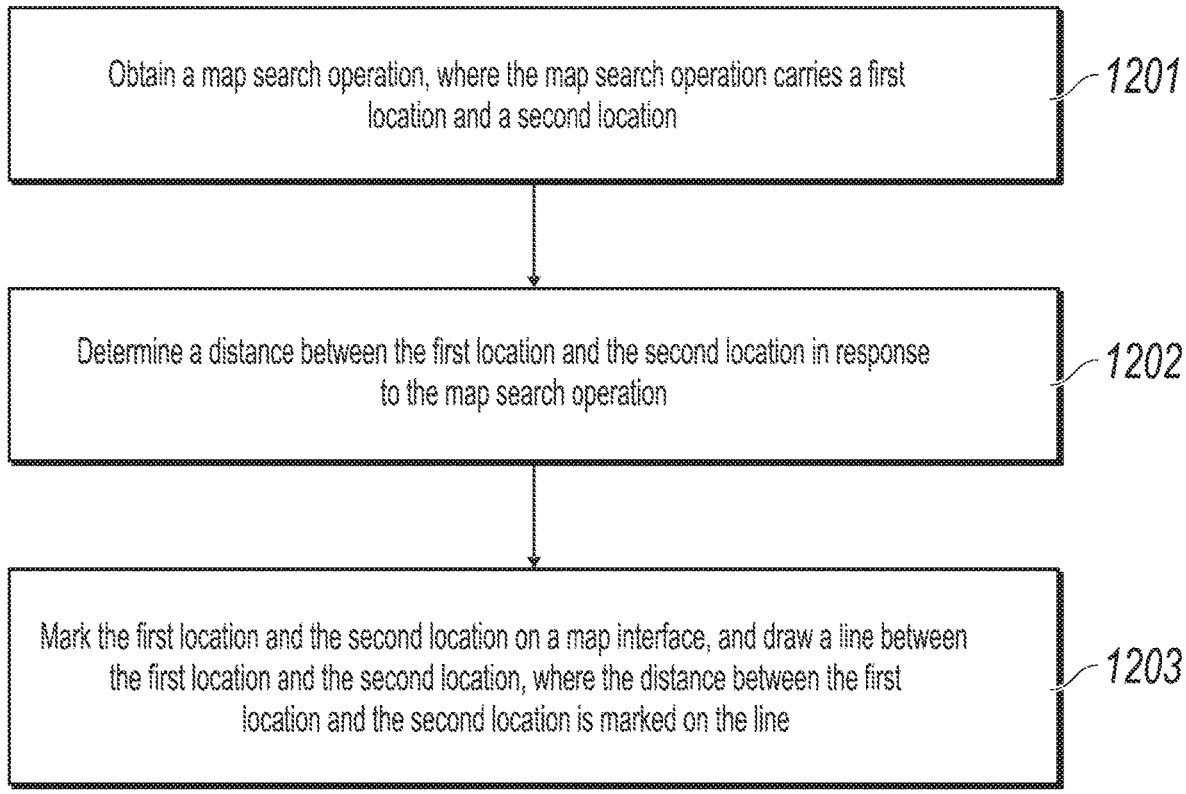
FIG. 12 is another flowchart illustrating a map display method, according to the present application.

FIG. 12 is a flowchart of an implementation of another map display method according to the present application. Although the present application provides method operation steps or apparatus structures shown in the following implementations or accompanying drawings, conventionally or without creative efforts, the method can include more or fewer operation steps, or the apparatus can include more or fewer module units. For steps or structures that have no necessary logical causal relationship, an execution sequence of the steps or a module structure of the apparatus is not limited to an execution sequence or a module structure shown in the implementations or the accompanying drawings of the present application. When the method or the module structure is applied to an actual apparatus or an actual terminal product, the method or the module structure can be executed based on the sequence of the method or the module structure in the implementations or the accompanying drawings, or can be executed in parallel (for example, a parallel processor, a multithreaded processing environment, or even a distributed processing environment).

As shown in FIG. 12, the another map display method provided in the present implementation of the present application can include the following steps.

S1201: Obtain a map search operation, where the map search operation carries a first location and a second location.

S1202: Determine a distance between the first location and the second location in response to the map search operation.

S1203: Mark the first location and the second location on a map interface, and draw a line between the first location and the second location, where the distance between the first location and the second location is marked on the line.

Figure 13:
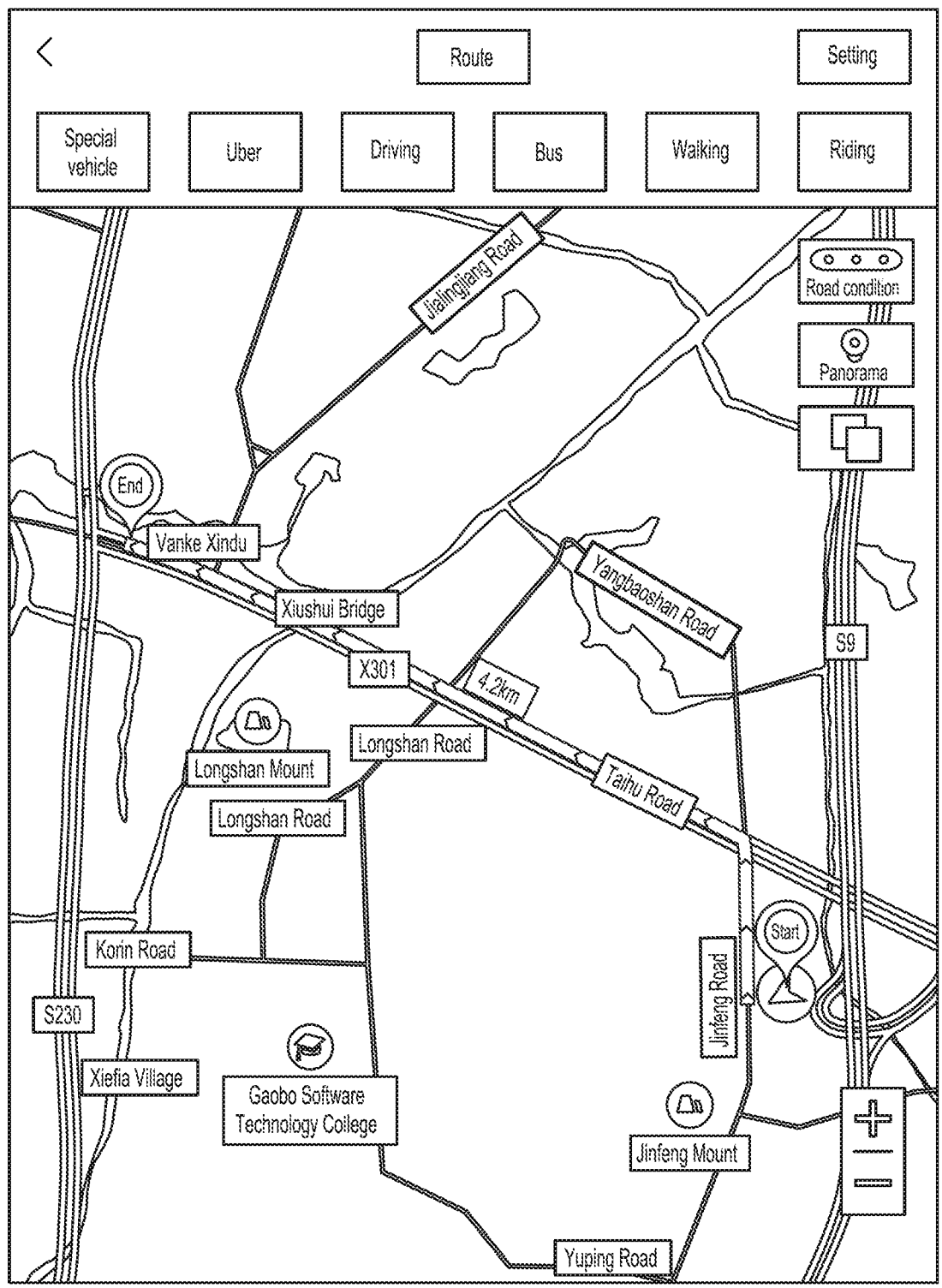
FIG. 13 is a schematic diagram illustrating distance information between a start point and an end point, according to the present application.

FIG. 13 is a schematic diagram illustrating an actual application scenario of the map display method. A user selects a start point (a first location) and an end point (a second location). Then a route search result is generated in a search state. To present the route search result, a route is displayed as a line between the start point and the end point. A distance between the start point and the end point is directly displayed on the line, so that the user can more intuitively determine the distance between the two locations. Therefore, the user can immediately determine the route and the distance between the start point and the end point only from a graph display interface of the search result, improving user experience.

The previous descriptions are provided in a general sense. It is worthwhile to note that different terminals and servers can have different processing modes.

For example:

Case 1: The user locally stores map information. In other words, a map package has been locally downloaded. After the user initiates a search request, a client does not need to initiate a search request to a map server, and only needs to obtain the map information from the client for identification and a search. As such, the client completes a search and interaction with the user.

Case 2: The user does not locally store corresponding map information. When a client of the user is connected to a network, the user initiates a search request by using the client, the client sends the search request to a map server, and the map server makes a search and match, and returns a search result to the client of the user for display. In such a case, the client completes interaction with the user, and the map server completes a search and match.

Case 3: The user does not locally store corresponding map information, and a client of the user is not connected to a network. In such a case, a map search function cannot be performed.

Therefore, in an implementation, a processing method and whether search and match operations are made by a terminal or a server can be determined based on an actual storage case, a networking status, etc. of the client of the user.

The following describes the map interaction method with reference to a specific scenario. However, it is worthwhile to note that the specific scenario is merely intended to better describe the present invention, but does not constitute an improper limitation on the present invention.

In an existing map search method, a distance serving as a result filtering item is separated from a search action, so that repeated operations are made, and an operation method is not intuitive and easy for the user.

In an example, a map interaction method is provided, including the following steps.

S1: A user taps and holds a location on a map to trigger range demarcation, and a prompt pops up.

S2: Adjust a size of a search range through dragging, where the tapped and held location is a center.

S3: Loosen a finger, confirm a last drag range, and display a search result in the range.

Figure 14:
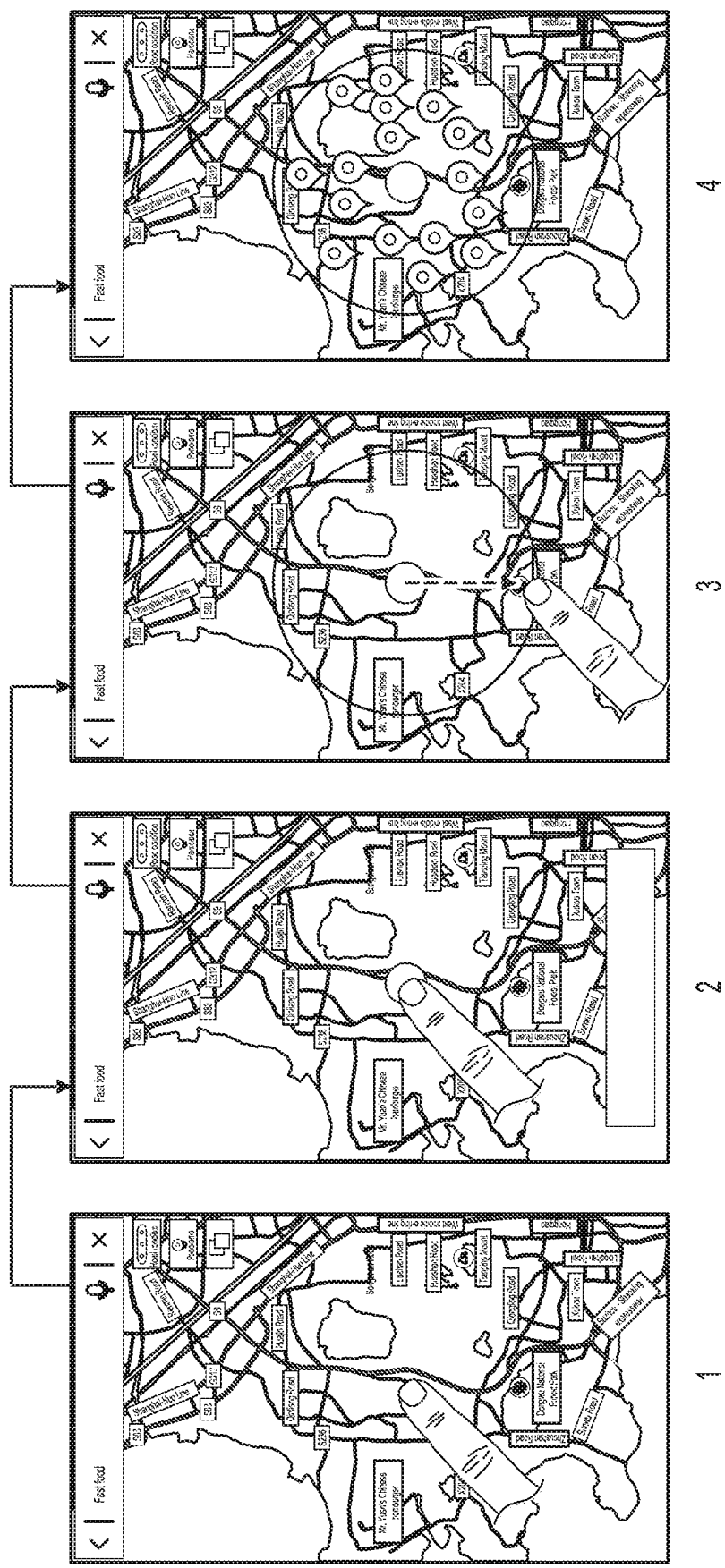
FIG. 14 is a schematic diagram illustrating a map interaction method in a specific scenario, according to the present application.

A presented interaction change can be shown in FIG. 14. The user selects a point and taps and holds the point, to trigger a range demarcation operation. "Drag to select a search range" can be provided as a prompt below. The user demarcates the search range through dragging. During dragging, a dragged distance is converted into an actual distance on the map in real time. After the user stops dragging, a drag stop point is used as a boundary of a finally determined search range, and a search result in the search range is displayed.

Figure 15:
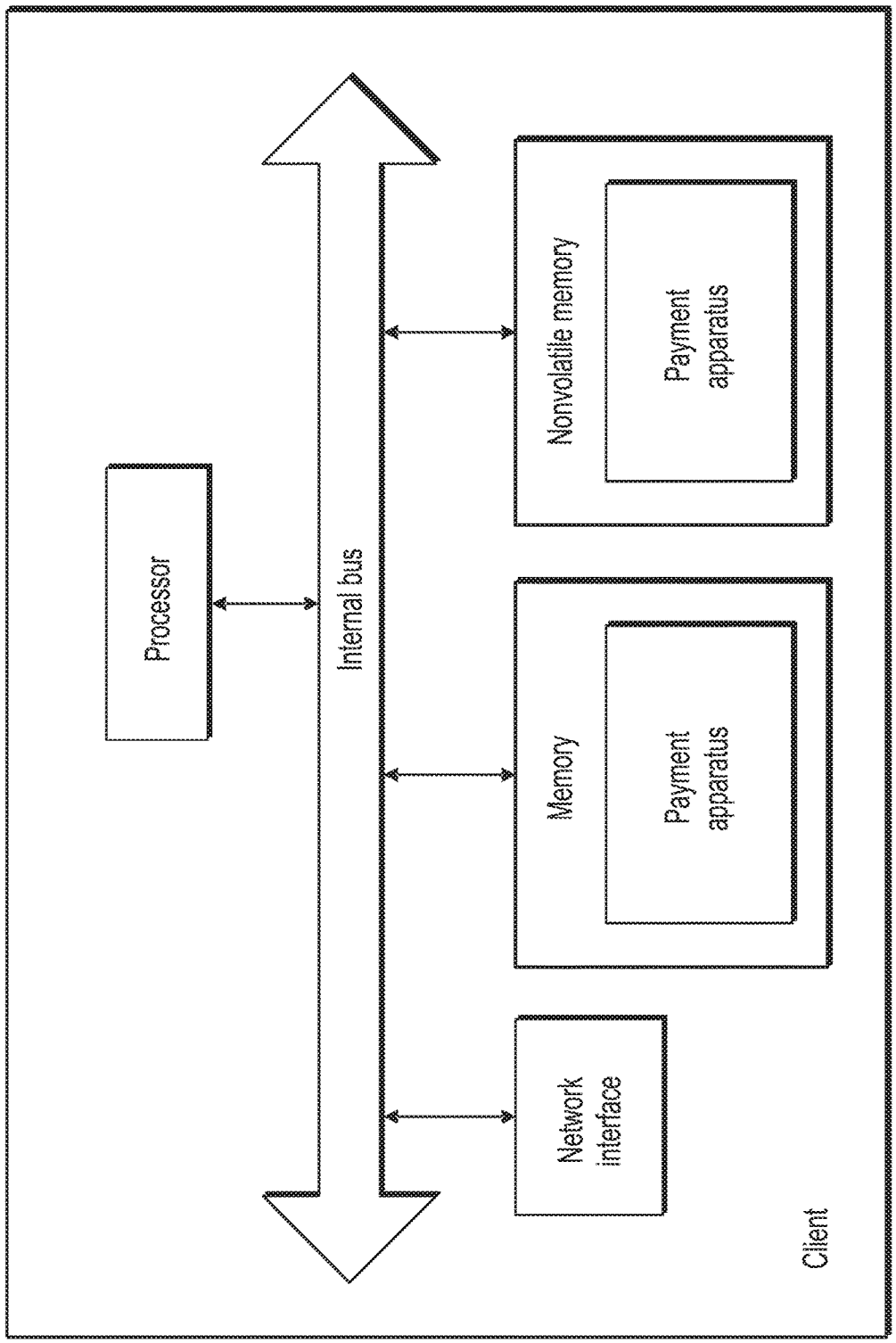
FIG. 15 is a schematic diagram illustrating hardware of a terminal, according to the present application.

FIG. 15 is a schematic structural diagram illustrating a client, according to an example implementation of the present application. As shown in FIG. 15, in terms of hardware, the client includes a processor, an internal bus, a network interface, a memory, and a nonvolatile memory, and certainly can further include hardware needed by other services. The processor reads a corresponding computer program from the nonvolatile memory to the memory for running, and a map interaction apparatus is logically formed. Certainly, in addition to a software implementation, the present application does not exclude another implementation, for example, a logic device or a combination of hardware and software. In other words, an execution body of the following processing procedure is not limited to each logical unit, and can be hardware or a logic device.

Figure 16:
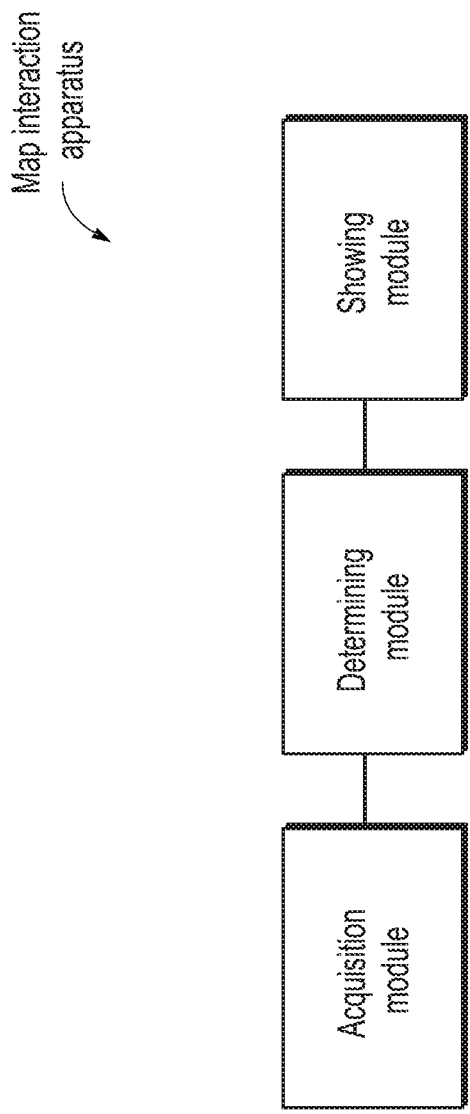
FIG. 16 is a schematic diagram illustrating a software module of a terminal, according to the present application.

Referring to FIG. 16, in a software implementation, the map interaction apparatus is applied to a client terminal and can include an acquisition module, a determining module, and a showing module.

The acquisition module is configured to obtain a map search operation.

The determining module is configured to determine a demarcated range and a target object based on the map search operation.

The showing module is configured to show one or more target objects in the demarcated range as a search result set.

Figure 17:
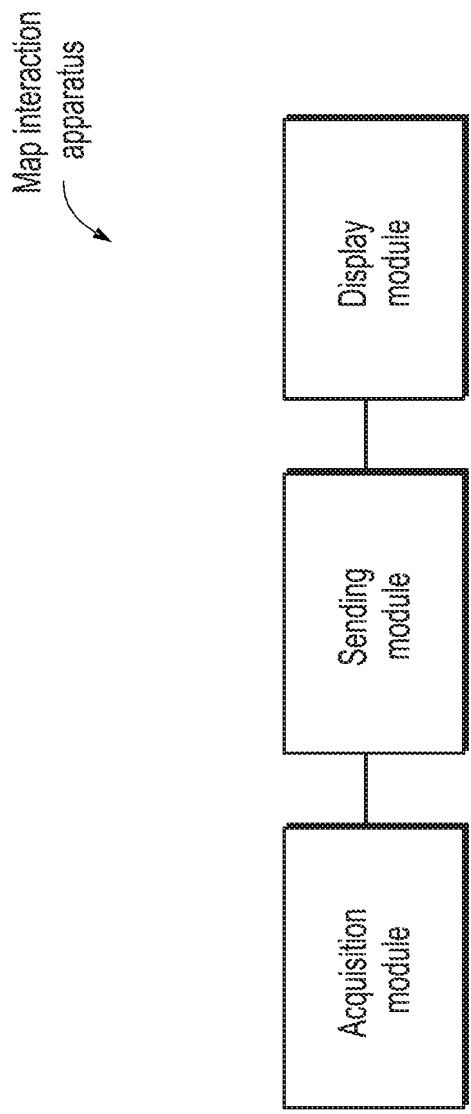
FIG. 17 is a schematic diagram illustrating another software module of a terminal, according to the present application.

Referring to FIG. 17, in a software implementation, the map interaction apparatus is applied to a client terminal and can further include an acquisition module, a determining module, and a display module.

The acquisition module is configured to obtain a map search operation.

The sending module is configured to send the map search operation to a server, where the map search operation carries a demarcated range and a target object.

The display module is configured to receive and display a search result returned by the server in response to the map search operation, where the search result includes one or more target objects in the demarcated range.

In a software implementation, the map interaction apparatus is applied to a client terminal and can further include an acquisition module, a determining module, and a display module.

The acquisition module is configured to obtain a map search operation, where the map search operation carries a first location and a second location.

The determining module is configured to determine a distance between the first location and the second location in response to the map search operation.

The display module is configured to mark the first location and the second location on a map interface and draw a line between the first location and the second location, where the distance between the first location and the second location is marked on the line.

Figure 18:
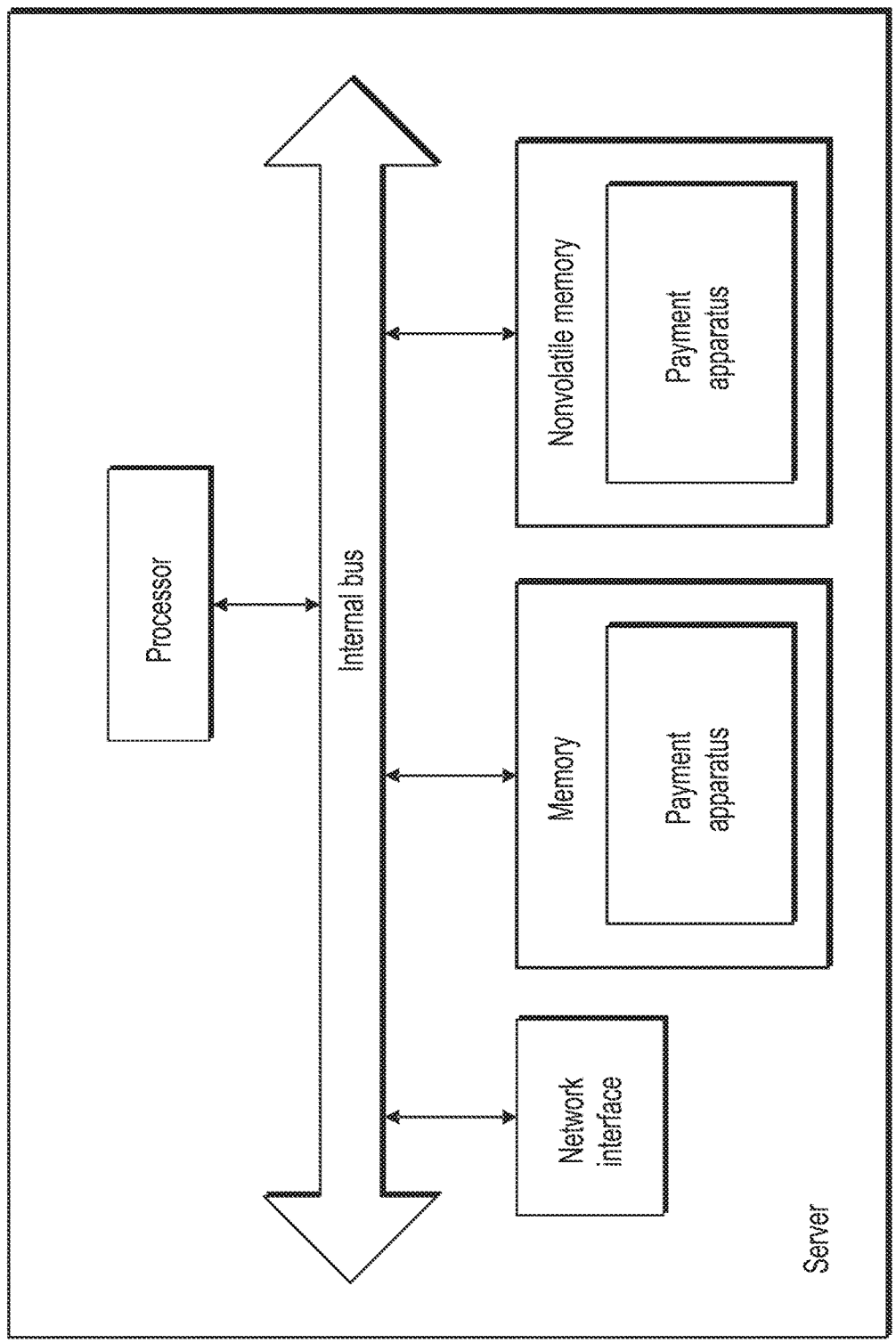
FIG. 18 is a schematic diagram illustrating hardware of a server, according to the present application.

FIG. 18 is a schematic structural diagram illustrating a server, according to an example implementation of the present application. As shown in FIG. 18, in terms of hardware, the server includes a processor, an internal bus, a network interface, a memory, and a nonvolatile memory, and certainly can further include hardware needed by other services. The processor reads a corresponding computer program from the nonvolatile memory to the memory for running, and a map interaction apparatus is logically formed. Certainly, in addition to a software implementation, the present application does not exclude another implementation, for example, a logic device or a combination of hardware and software. In other words, an execution body of the following processing procedure is not limited to each logical unit, and can be hardware or a logic device.

Figure 19:
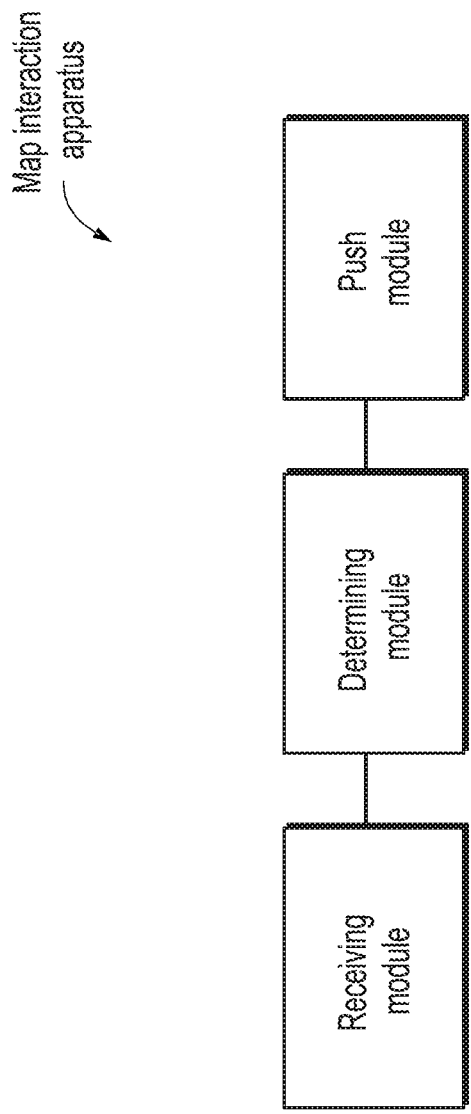
FIG. 19 is a schematic diagram illustrating a software module of a server, according to the present application.

Referring to FIG. 19, in a software implementation, the map interaction apparatus is applied to the server and can include a receiving module, a determining module, and a push module.

The receiving module is configured to receive a map search operation.

The determining module is configured to determine a demarcated range and a target object based on the map search operation.

The push module is configured to push one or more target objects in the demarcated range to a terminal side as a search result.

According to the method, the apparatus, the system, the server, and the terminal for map interaction, search, and display provided in the present application, interaction, search, and display are based on the demarcated range. When the search result is presented, only a result in the demarcated range is displayed. Therefore, a system resource is saved. Further, when the search result is displayed, the demarcated range of the user is also displayed, so that the user can clearly know a relative distance of each search result, etc. through one search, to effectively improve user experience.

The above description in the implementations of the present application is merely an application of some implementations of the present application, and an implementation slightly modified based on some standards, models, and methods can also be used to implement the solutions in the implementations of the present application. Certainly, other non-creative changes in accordance with steps of the processing method in the implementations of the present application can still be used to implement the same application. Details are omitted here for simplicity.

Although the present application provides the method operation steps in the implementations or the flowcharts, more or fewer operation steps can be included based on conventional or noncreative efforts. The sequence of the steps listed in the implementations is merely one of numerous step execution sequences, and does not represent the unique execution sequence. For an actual apparatus or client product, the steps can be performed based on the method sequence illustrated in the implementations or accompanying drawings or performed in parallel (for example, a parallel processor or a multithreaded processing environment).

The apparatuses or modules described in the previous implementations can be implemented by a computer chip or an entity, or can be implemented by a product with a certain function. For ease of description, the previous apparatus is described by dividing the functions into various modules. Certainly, when the present application is implemented, the functions of all modules can be implemented in one or more pieces of software and/or hardware. Certainly, a module that implements a certain function can be implemented by using a combination of a plurality of submodules or subunits.

The method, apparatus, or module in the present application can be implemented by using computer readable program code. A controller can be implemented in any appropriate way. For example, the controller can take the form of, for example, a microprocessor, a processor, a computer readable medium storing computer readable program code (for example, software or firmware) that can be executed by the microprocessor or the processor, a logic gate, a switch, an application-specific integrated circuit (ASIC), a programmable logic controller, or an embedded microcontroller. Examples of the controller include but are not limited to the following microcontrollers: ARC 625D, Atmel AT91SAM, Microchip PIC18F26K20, and Silicone Labs C8051F320. A memory controller can be implemented as a part of control logic of a memory. A person skilled in the art also knows that, in addition to implementing the controller by using the computer readable program code, method steps can be logically programmed to allow the controller to implement the same function in forms of the logic gate, the switch, the application-specific integrated circuit, the programmable logic controller, and the embedded microcontroller. Therefore, the controller can be considered as a hardware component, and an apparatus included in the controller and configured to implement various functions can also be considered as a structure in the hardware component. Or the apparatus configured to implement various functions can even be considered as both a software module implementing the method and a structure in the hardware component.

Some modules of the apparatus in the present application can be described in the general context of a computer executable instruction executed by a computer, for example, a program module. Generally, the program module includes a routine, a program, an object, a component, a data structure, a type, etc. that executes a specific task or implements a specific abstract data type. The present application can also be practiced in distributed computing environments. In the distributed computing environments, tasks are performed by remote processing devices connected through a communications network. In the distributed computing environment, the program module can be located in both local and remote computer storage media including storage devices.

It can be seen from description of the implementations that, a person skilled in the art can clearly understand that the present application can be implemented by using software and necessary hardware. Based on such an understanding, the technical solutions of the present application essentially, or the part contributing to the existing technologies can be implemented in the form of a software product or can be implemented during a data migration implementation process. The computer software product can be stored in a storage medium, such as a ROM/RAM, a magnetic disk, or an optical disc, and includes several instructions for instructing a computer device (which can be a personal computer, a mobile device, a server, a network device, etc.) to perform the methods described in the implementations of the present application or some parts of the implementations.

The implementations in the present specification are described in a progressive method. For the same or similar parts in the implementations, references can be made to each other. Each implementation focuses on a difference from other implementations. All or some parts of the present application can be used in many general-purpose or dedicated computer system environments or configurations, for example, a personal computer, a server computer, a handheld device, a portable device, a tablet device, a mobile communications terminal, a multiprocessor system, a microprocessor system, a programmable electronic device, a network PC, a small computer, a mainframe computer, and a distributed computing environment including any of the above systems or devices.

Although the present application is described by using the implementations, a person of ordinary skill in the art knows that many modifications and variations of the present application can be made without departing from the spirit of the present application. It is expected that the claims include these modifications and variations without departing from the spirit of the present application.

Figure 20:
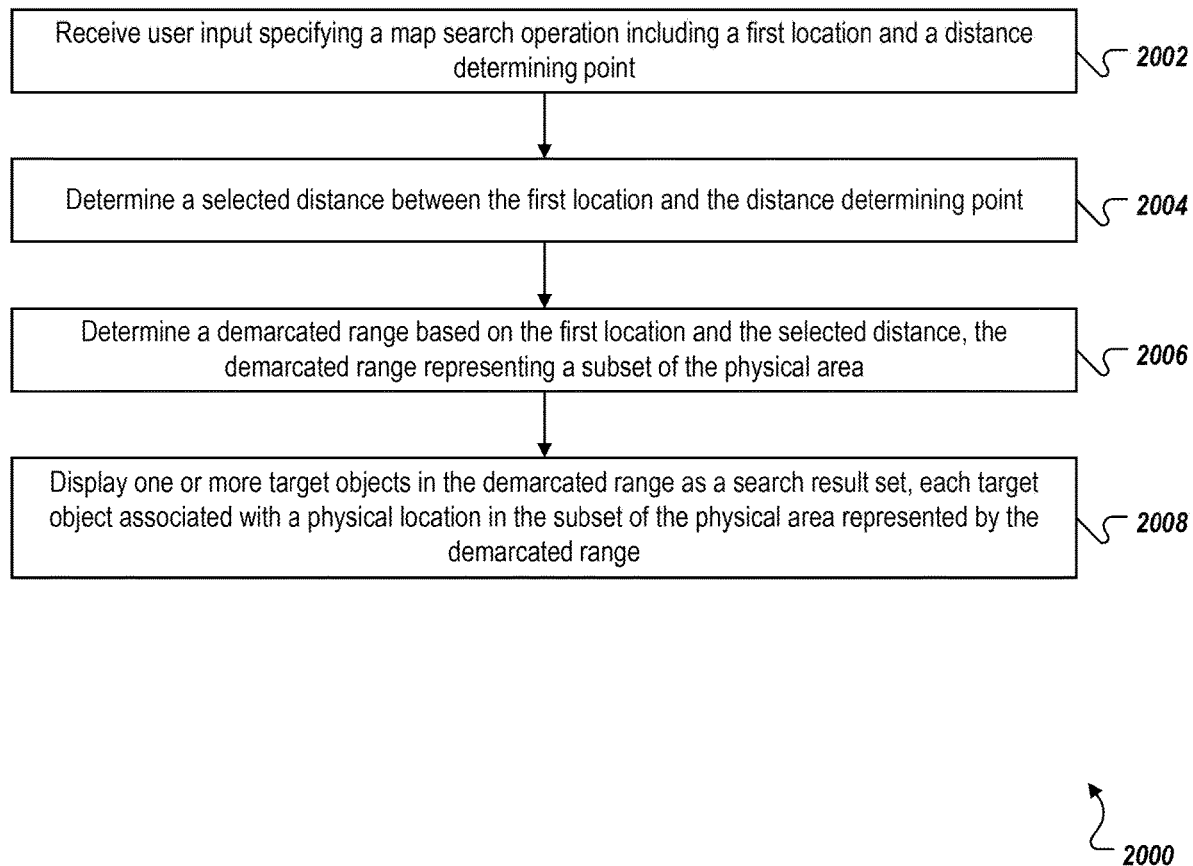
FIG. 20 is a flowchart illustrating an example of a computer-implemented method for map interface interaction, according to an implementation of the present disclosure.

FIG. 20 is a flowchart illustrating an example of a computer-implemented method 2000 for map interface interaction, according to an implementation of the present disclosure. For clarity of presentation, the description that follows generally describes method 2000 in the context of the other figures in this description. However, it will be understood that method 2000 can be performed, for example, by any system, environment, software, and hardware, or a combination of systems, environments, software, and hardware, as appropriate. In some implementations, various steps of method 2000 can be run in parallel, in combination, in loops, or in any order.

At 2002, user input is received specifying a map search operation, the map search operation including a first location and a distance determining point, wherein the first location and the distance determining point each specify a location in a set of map data representing a physical area, and wherein the first location and the distance determining point represent physical locations in the physical area. In some cases, receiving the user input specifying the map search operation includes identifying a drag operation whose start point is the first location on the map interface, and using an end point of the drag operation as the distance determining point. In some implementations, receiving the user input specifying the map search operation includes identifying a point selected by a user after the first location on the map interface as the distance determining point. In some implementations, receiving the user input specifying the map search operation includes receiving text entered by a user in a text form, the text representing the first location and the selected distance.

At 2004, a selected distance between the first location and the distance determining point is determined, wherein the selected distance represents a physical distance between the physical locations represented by the first location and the distance determining point.

At 2006, a demarcated range is determined based on the first location and the selected distance, the demarcated range representing a subset of the physical area. In some cases, determining the demarcated range based on the first location and the selected distance includes generating a circle area as the demarcated range, the circle area having the first location as a center and the distance between the first location and the distance determining point as a radius. In some implementations, determining the demarcated range based on the first location and the selected distance includes generating a square area as the demarcated range, the square area having the first location as a center and the distance determining point as a vertex of the square area. In some examples, determining the demarcated range based on the first location and the selected distance includes generating circular sector area with a predetermined angle as the demarcated range, the circular sector area having the first location as a start point, the distance between the first location and the distance determining point as a radius, and a drag operation received as user input as a central direction.

At 2008, one or more target objects in the demarcated range are displayed as a search result set, each target object associated with a physical location in the subset of the physical area represented by the demarcated range. In some cases, receiving the user input specifying the map search operation includes receiving touch input representing the first location and the selected distance from a visual map interface displayed on a touchscreen display, and wherein displaying the one or more target objects in the demarcated range as a search result set includes displaying the demarcated range on the visual map interface.

In some implementations, the method 2000 include prior to displaying the one or more target objects: sending a search request to a map server, the search request including the demarcated range; and receiving a search response from the server including the one or more target objects in the demarcated range.

As discussed herein, the present techniques relate to user interaction with a visual map interface, such as a visual map interface displayed on a touchscreen display of a user device. The techniques enable a user to search for target objects (e.g., types of businesses, landmarks, etc.) within a specified distance of a particular location. A user can input the specified distance and the particular location into the visual map interface (e.g., by touching points on the screen or entering text). A demarcated range is then generated from the specified distance and the particular location. The demarcated range is a geometric shape (e.g., a circle, square, etc.) representing a portion of the physical area represented by the displayed map. Target objects meeting search criteria provided by the user that are within the demarcated range are displayed as search results (e.g., displayed as points in the visual map interface).

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for map interaction, the method comprising:
receiving user input specifying a map search operation from a visual map interface, the map search operation including a first location and a distance determining point, each of the first location and the distance determining point representing a first physical location and a second physical location, respectively;

determining a physical distance between the first location and the distance determining point;

generating a demarcated range comprising an area having the first location as a center and the distance determining point as a vertex of the area, the demarcated range representing a subset of the area; and displaying one or more target objects in the demarcated range on the visual map interface, each target object associated with a physical location in the subset of the area.

2. The computer-implemented method of claim 1, further comprising:

prior to displaying one or more target objects:

sending a search request to a map server, the search request including the demarcated range; and receiving a search response from the map server including the one or more target objects in the demarcated range.

3. The computer-implemented method of claim 1, wherein receiving the user input specifying the map search operation includes identifying a drag operation whose start point is the first location on the visual map interface, and using an end point of the drag operation as the distance determining point on the visual map interface.

4. The computer-implemented method of claim 1, wherein receiving the user input specifying the map search operation includes identifying a point selected by a user after the first location on the visual map interface as the distance determining point.

5. The computer-implemented method of claim 1, wherein receiving the user input specifying the map search operation includes receiving text entered by a user in a text form, the text representing the first location and the physical distance.

6. The computer-implemented method of claim 1, wherein receiving the user input specifying the map search operation includes receiving touch input representing the first location and the physical distance from the visual map interface displayed on a touchscreen display, and wherein displaying one or more target objects in the demarcated range includes displaying the demarcated range on the visual map interface displayed on the touchscreen display.

7. The computer-implemented method of claim 1, wherein the area has a square shape.

8. A non-transitory, computer-readable medium storing one or more instructions executable by a computer system to perform operations comprising:

receiving user input specifying a map search operation from a visual map interface, the map search operation including a first location and a distance determining point, each of the first location and the distance determining point representing a first physical location and a second physical location, respectively;

determining a physical distance between the first location and the distance determining point;

generating a demarcated range comprising an area having the first location as a center and the distance determining point as a vertex of the area, the demarcated range representing a subset of the area; and displaying one or more target objects in the demarcated range on the visual map interface, each target object associated with a physical location in the subset of the area.

9. The non-transitory, computer-readable medium of claim 8, the operations further comprising:

prior to displaying one or more target objects:

sending a search request to a map server, the search request including the demarcated range; and receiving a search response from the map server including the one or more target objects in the demarcated range.

10. The non-transitory, computer-readable medium of claim 8, wherein receiving the user input specifying the map search operation includes identifying a drag operation whose start point is the first location on the visual map interface, and using an end point of the drag operation as the distance determining point on the visual map interface.

11. The non-transitory, computer-readable medium of claim 8, wherein receiving the user input specifying the map search operation includes identifying a point selected by a user after the first location on the visual map interface as the distance determining point.

12. The non-transitory, computer-readable medium of claim 8, wherein receiving the user input specifying the map search operation includes receiving text entered by a user in a text form, the text representing the first location and the physical distance.

13. The non-transitory, computer-readable medium of claim 8, wherein receiving the user input specifying the map search operation includes receiving touch input representing the first location and the physical distance from the visual map interface displayed on a touchscreen display, and wherein displaying one or more target objects in the demarcated range includes displaying the demarcated range on the visual map interface displayed on the touchscreen display.

14. The non-transitory, computer-readable medium of claim 8, wherein the area has a square shape.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving user input specifying a map search operation from a visual map interface, the map search operation including a first location and a distance determining point, each of the first location and the distance determining point representing a first physical location and a second physical location, respectively;

determining a physical distance between the first location and the distance determining point;

generating a demarcated range comprising an area having the first location as a center and the distance determining point as a vertex of the area, the demarcated range representing a subset of the area; and displaying one or more target objects in the demarcated range on the visual map interface, each target object associated with a physical location in the subset of the area.

16. The computer-implemented system of claim 15, the operations further comprising:

prior to displaying one or more target objects:

sending a search request to a map server, the search request including the demarcated range; and receiving a search response from the map server including the one or more target objects in the demarcated range.

17. The computer-implemented system of claim 15, wherein receiving the user input specifying the map search operation includes identifying a drag operation whose start point is the first location on the visual map interface, and using an end point of the drag operation as the distance determining point on the visual map interface.

18. The computer-implemented system of claim 15, wherein receiving the user input specifying the map search operation includes identifying a point selected by a user after the first location on the visual map interface as the distance determining point.

19. The computer-implemented system of claim 15, wherein receiving the user input specifying the map search operation includes receiving text entered by a user in a text form, the text representing the first location and the physical distance.

20. The computer-implemented system of claim 15, wherein receiving the user input specifying the map search operation includes receiving touch input representing the first location and the physical distance from the visual map interface displayed on a touchscreen display, and wherein displaying one or more target objects in the demarcated range includes displaying the demarcated range on the visual map interface displayed on the touchscreen display.

21. The computer-implemented system of claim 15, wherein the area has a square shape.

\* \* \* \* \*